United States Patent [19]

Matsuura et al.

[11] Patent Number: 4,709,482
[45] Date of Patent: Dec. 1, 1987

[54] ARBITRARY-DIRECTION TRACER CONTROL UNIT

[75] Inventors: Hitoshi Matsuura, Hachioji; Hiroshi Sakurai, Hino, both of Japan

[73] Assignee: Fanuc Ltd., Minamitsuru, Japan

[21] Appl. No.: 855,627

[22] PCT Filed: Jul. 22, 1985

[86] PCT No.: PCT/JP85/00414
§ 371 Date: Mar. 21, 1986
§ 102(e) Date: Mar. 21, 1986

[87] PCT Pub. No.: WO86/00845
PCT Pub. Date: Feb. 13, 1986

[30] Foreign Application Priority Data

Jul. 27, 1984 [JP] Japan ............................. 59-157006

[51] Int. Cl.⁴ ............................................. G01B 7/28
[52] U.S. Cl. ..................................... 33/1 M; 33/503; 33/505; 33/546
[58] Field of Search ................ 33/1 M, 503, 504, 505, 33/179 SR, 545, 546, 1 PT, 1 N

[56] References Cited

U.S. PATENT DOCUMENTS

| | | | |
|---|---|---|---|
| 3,749,501 | 7/1973 | Wieg | 33/1 M |
| 3,840,994 | 10/1974 | Izumi et al. | 33/503 |
| 4,276,698 | 7/1981 | Dore et al. | 33/1 M |
| 4,455,755 | 6/1984 | Fritsche et al. | 33/504 |
| 4,523,380 | 6/1985 | Wright | 33/1 M |
| 4,597,182 | 7/1986 | Rinn | 33/1 M |
| 4,603,487 | 8/1986 | Matsunata | 33/503 |

Primary Examiner—Willis Little
Attorney, Agent, or Firm—Staas & Halsey

[57] ABSTRACT

The present invention is directed to an arbitrary-direction tracer control unit which permits arbitrary setting of the tracer feed direction, and is intended to allow ease in changing the tracer feed direction even during tracing.

A memory (M) has stored therein data indicating the tracer feed direction, that is, the angle between the tracer feed axis and the X-axis. A correction angle setting device (COM) sets a correction angle with respect to the tracer feed axis. An adder (ADD) adds together the angle stored in the memory (M) and the correction angle set on the correction angle setting device (COM), and provides the added output to a tracing operation device (PRO). The tracing operation device (PRO) operates, on the basis of the results of addition by the adder (ADD) and a displacement signal from a tracer head (TH), a velocity in each axis direction at which a model and the tracer head (TH) are moved relative to each other in a direction corresponding to the results of addition by the adder (ADD).

1 Claim, 5 Drawing Figures

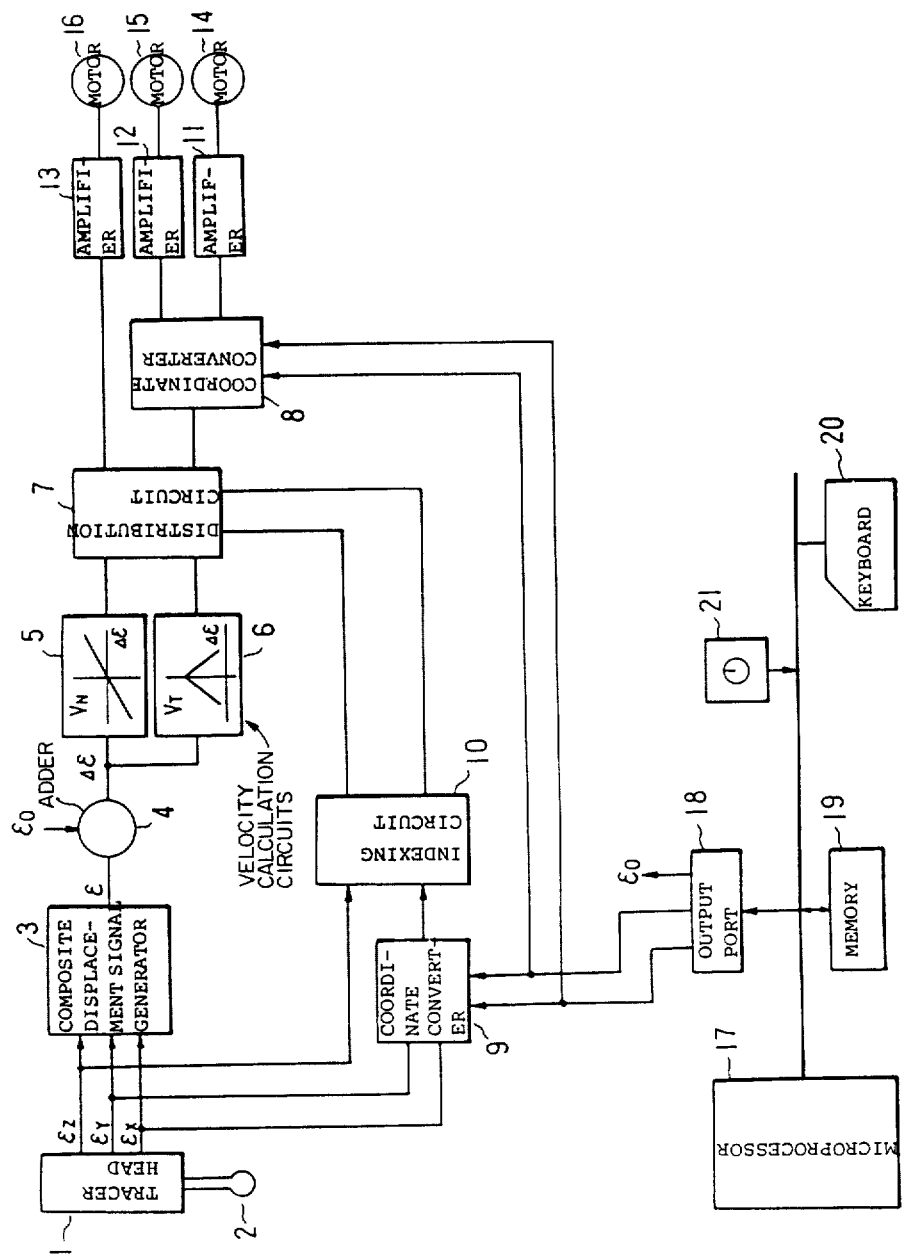

ARBITRARY-DIRECTION TRACER CONTROL UNIT

BACKGROUND OF THE INVENTION

1. Field of the Invention

The present invention relates to an improvement in an arbitrary-direction tracer control unit which permits arbitrary setting of the tracer feed direction, and, more particularly, to an arbitrary-direction tracer control unit which allows an easy change of the tracer feed direction even during tracing.

2. Description of the Related Art

In arbitrary-direction tracing in which the tracer feed direction in an X-Y plane is a direction at an angle $\alpha$ (an A-axis) with respect to the X-axis as depicted in FIG. 5, tracer feed rates Va and Vz in the A-axis and the Z-axis are derived from a displacement signal available from a tracer head, operations $Vx = Va \cdot \cos \alpha$ and $Vy = Va \cdot \sin \alpha$ are conducted using the feed rate Va to obtain tracer feed rates Vx and Vz, and a model is driven in the X-, Y- and Z-axes at the speeds corresponding to the tracer feed rates Vx, Vy, and Vz.

Conventional arbitrary-direction tracer control equipment is of the type that prestores the angle $\alpha$ between the X-axis and the A-axis in a memory and performs the above-mentioned operations on the basis of the stored contents of the memory to obtain the feed rates in the X- and Y-axis directions; so the tracer feed direction cannot be changed unless the stored contents of the memory are changed. Accordingly, with the prior art equipment, it is difficult for an operator to change the tracer feed direction while monitoring the cutting conditions.

SUMMARY OF THE INVENTION

The present invention obviates such a defect as mentioned above, and has for an object to permit an easy change of the tracer feed direction even during tracing.

FIG. 1 is a block diagram illustrating the arrangement of the present invention. A memory means M has stored therein an angle indicating the direction of the tracer feed axis, that is, an angle between the X-axis and the tracer feed axis. A correction angle setting means COM is used to set a correction angle with respect to the tracer feed axis direction. An adder means ADD adds together the angle stored in the memory means M and the correction angle set by the correction angle setting means COM and then provides the added output to a tracing operation means PRO. Based on the results of the addition by the adder means ADD and a displacement signal corresponding to the displacement of a stylus ST provided from a tracer head TH, the tracing operation means PRO produces the feed rate in each axis direction at which the model and the tracer head are moved relative to each other in the direction corresponding to the results of the addition by the adder means ADD.

BRIEF DESCRIPTION OF THE DRAWINGS

FIG. 2 is a block diagram illustrating an embodiment of the present invention;

DESCRIPTION OF THE PREFERRED EMBODIMENTS

Figure 1:
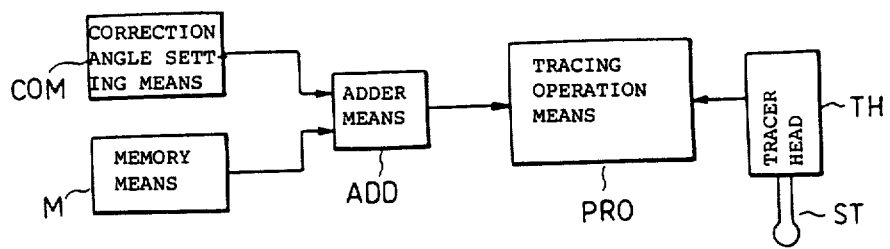
FIG. 1 is a block diagram illustrating the arrangement of the present invention.
Figure 5:
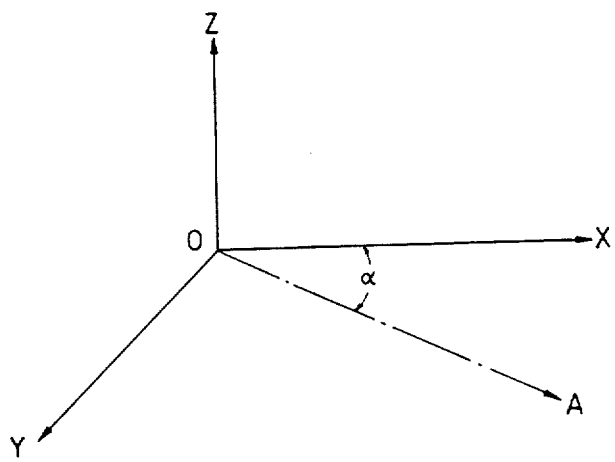
FIG. 5 is a diagram for explaining arbitrary-direction tracing.

FIG. 2 illustrates in block form an embodiment of the present invention. Reference numeral 1 indicates a tracer head, 2 a stylus, 3 a composite displacement signal generator, 4 an adder, 5 and 6 velocity calculation circuits for obtaining normal-direction velocity $V_N$ and tangential-direction velocity $V_T$, 7 a distribution circuit, 8 and 9 coordinate converters, 10 an indexing circuit, 11 to 13 X-, Y- and Z-axis amplifiers, 14 to 16 X-, Y- and Z-axis motors, 17 a microprocessor, 18 an output port, 19 a memory, 20 a keyboard, and 21 a correction angle setting dial for setting a correction angle with respect to the tracer feed direction. In an area #N of the memory 19 is stored the angle between the tracer feed axis and the X-axis, i.e. the angle $\alpha$ indicating the direction of the tracer feed axis.

Upon starting of a tracing operation, the tracer head 1 outputs displacement signals $\epsilon_x$, $\epsilon_y$, and $\epsilon_z$ corresponding to displacements of the stylus 2 in the X-, Y- and Z-axis directions. The displacement signals $\epsilon_x$ and $\epsilon_y$ are provided to the composite displacement signal generator 3 and the coordinate converter 9 and the displacement signal $\epsilon_z$ is applied to the composite displacement signal generator 3 and the indexing circuit 10. The composite displacement signal generator 3 derives from the displacement signals $\epsilon_x$, $\epsilon_y$, and $\epsilon_z$ a composite displacement signal $\epsilon = \sqrt{\epsilon_x^2 + \epsilon_y^2 + \epsilon_z^2}$, which is provided to the adder 4. The adder 4 obtains a difference $\Delta\epsilon = \epsilon - \epsilon_0$ between the composite displacement signal $\epsilon$ and a reference displacement signal $\epsilon_0$ which is applied to the adder from the microprocessor 17 via the output port 18. The thus obtained difference is supplied to the velocity calculation circuits 5 and 6. The velocity calculation circuits 5 and 6 obtain the normal-direction velocity $V_N$ and the tangential-direction velocity $V_T$ on the basis of the difference $\Delta\epsilon$, and provide the velocities to the distribution circuit 7.

The coordinate converter 9 creates a displacement component signal $\epsilon\alpha$ indicating a displacement component in the tracer feed axis direction, by performing an operation according to the following equation (1) on the basis of the displacement signals $\epsilon_x$ and $\epsilon_y$ and signals sin $\alpha$ and cos $\alpha$ which are indicative of the cosine and sine of the angle between the tracer feed axis and the X-axis and are provided via the output port 18 to the coordinate converter. The displacement component signal thus produced is applied to the indexing circuit 10. The signals sin $\alpha$ and cos $\alpha$ are produced by the microprocessor 17 based on the angle $\alpha$ stored in the area #N of the memory 19.

$$\epsilon\alpha = \epsilon_x \cdot \cos \alpha + \epsilon_y \cdot \sin \alpha \tag{1}$$

The indexing circuit 10 yields a cosine signal cos $\beta$ and a sine signal sin $\beta$ of the direction of displacement in a plane containing the A-axis and the Z-axis which are based on the displacement component signal $\epsilon\alpha$ from the coordinate converter 9 and the displacement signal $\epsilon_z$, the cosine and sine signals being applied to the distribution circuit 7. The distribution circuit 7 derives a velocity signal Va in the direction of the tracer feed axis and a velocity signal Vz in the Z-axis direction from the cosine signal $\cos \beta$, the sine signal $\sin \beta$ and the normal-direction velocity $V_N$ and the tangential-direction velocity $V_T$ provided from the velocity calculation circuits 5 and 6. The velocity signal Vz in the Z-axis direction is applied to the amplifier 13, the output of which is provided to the motor 16 to drive it. The velocity signal Va in the direction of the tracer feed axis is provided to the coordinate converter 8, wherein operations according to the following equations (2) and (3) are performed, obtaining velocity signals Vx and Vy in the X-axis and Y-axis directions.

$$Vx = Va \cdot \cos \alpha \qquad (2)$$

$$Vy = Va \cdot \sin \alpha \qquad (3)$$

The velocity signals Vx and Vy in the X-axis and Y-axis directions are respectively applied to the amplifiers 11 and 12, the outputs of which are provided to the motors 14 and 15 to drive them, effecting a tracer feed in the A-axis direction.

When changing the tracer feed direction during the tracer feed in the A-axis direction as described above, an operator sets a correction angle $\Delta \alpha$ on the correction angle setting dial 21, and at the same time enters from the keyboard 20 a command for changing the tracer feed axis. The microprocessor 17 responds to the command and starts processing according to the flowchart shown in FIG. 3.

Figure 3:
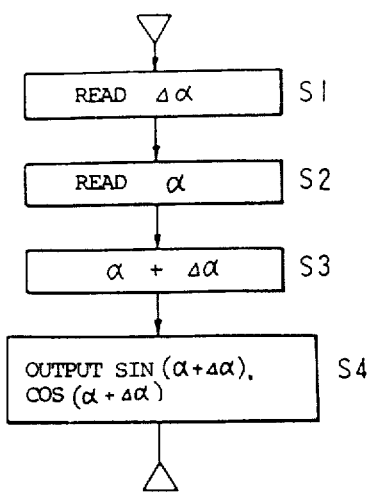
FIG. 3 is a flowchart showing the contents of processing by a microprocessor 17.
Figure 4:
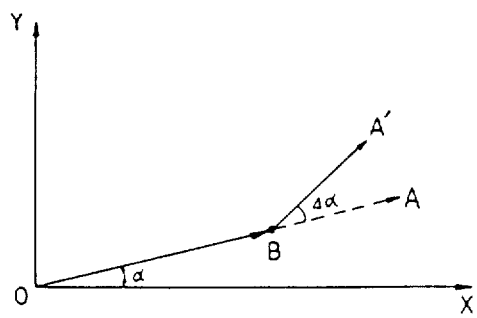
FIG. 4 is a diagram schematically showing a cutting path according to the present invention.

Upon starting processing in accordance with the flowchart depicted in FIG. 3, the microprocessor 17 first reads the correction angle $\Delta \alpha$ set on the correction angle setting dial 21 (step S1), reads the angle $\alpha$ between the X-axis and the A-axis stored in the predetermined area #N of the memory 19 (step S2), adds together the angles $\Delta \alpha$ and $\alpha$ (step S3), and supplies the coordinate converters 8 and 9 with signals $\sin (\alpha + \Delta \alpha)$ and $\cos (\alpha + \Delta \alpha)$ created on the basis the added result $\Delta \alpha + \alpha$ (step S4). As a result, the processes of steps S1 to S4 take place during cutting at a point B, by which the tracer feed axis is changed from the A-axis to an A'-axis, as illustrated in FIG. 4.

As described above, the present invention is provided with a correction angle setting means comprised of the correction angle setting dial 21 for setting a correction angle with respect to the tracer feed axis and an adder means for adding together the correction angle and the angle representing the direction of the tracer feed axis, stored in a memory means. Since the tracer feed direction can be changed by setting the correction angle with the correction angle setting means, the invention has the advantage that the tracer feed direction can easily be changed even during tracing.

We claim:

1. An arbitrary-direction tracer control unit, comprising:

a tracer head for outputting a displacement signal corresponding to the displacement of a stylus in contact with a surface of a mode;

a memory for storing an angle between an X-axis and a tracer feed axis;

correction angle setting means for setting a fixed value correction angle with respect to the tracer feed axis;

adder means for adding together the angle stored in said memory and the correction angle set by said correction angle setting means and producing an output; and tracing operation means for operating, on the basis of the added output of said adder means and the displacement signal from said tracer head, at a feed rate in each axis direction at which the model and the stylus are moved relative to each other in a direction corresponding to the added result output by said adder means.

* * * * *

UNITED STATES PATENT AND TRADEMARK OFFICE
CERTIFICATE OF CORRECTION

PATENT NO. : 4,709,482

DATED : December 1, 1987

INVENTOR(S) : Hitoshi Matsuura, Hiroshi Sakurai

It is certified that error appears in the above-identified patent and that said Letters Patent is hereby corrected as shown below:

In the Abstract:

Line 6, delete the ¶, should follow directly after "tracing" in line 5.

Col. 4, line 21, claim 1, "mode" should be --model--.

Signed and Sealed this

Fourteenth Day of June, 1988

Attest:

DONALD J. QUIGG

Attesting Officer

Commissioner of Patents and Trademarks